May 22, 1951 — L. C. HAMMOND — 2,554,299
SLOT BAR FOR SAWING MACHINES
Filed Feb. 11, 1949
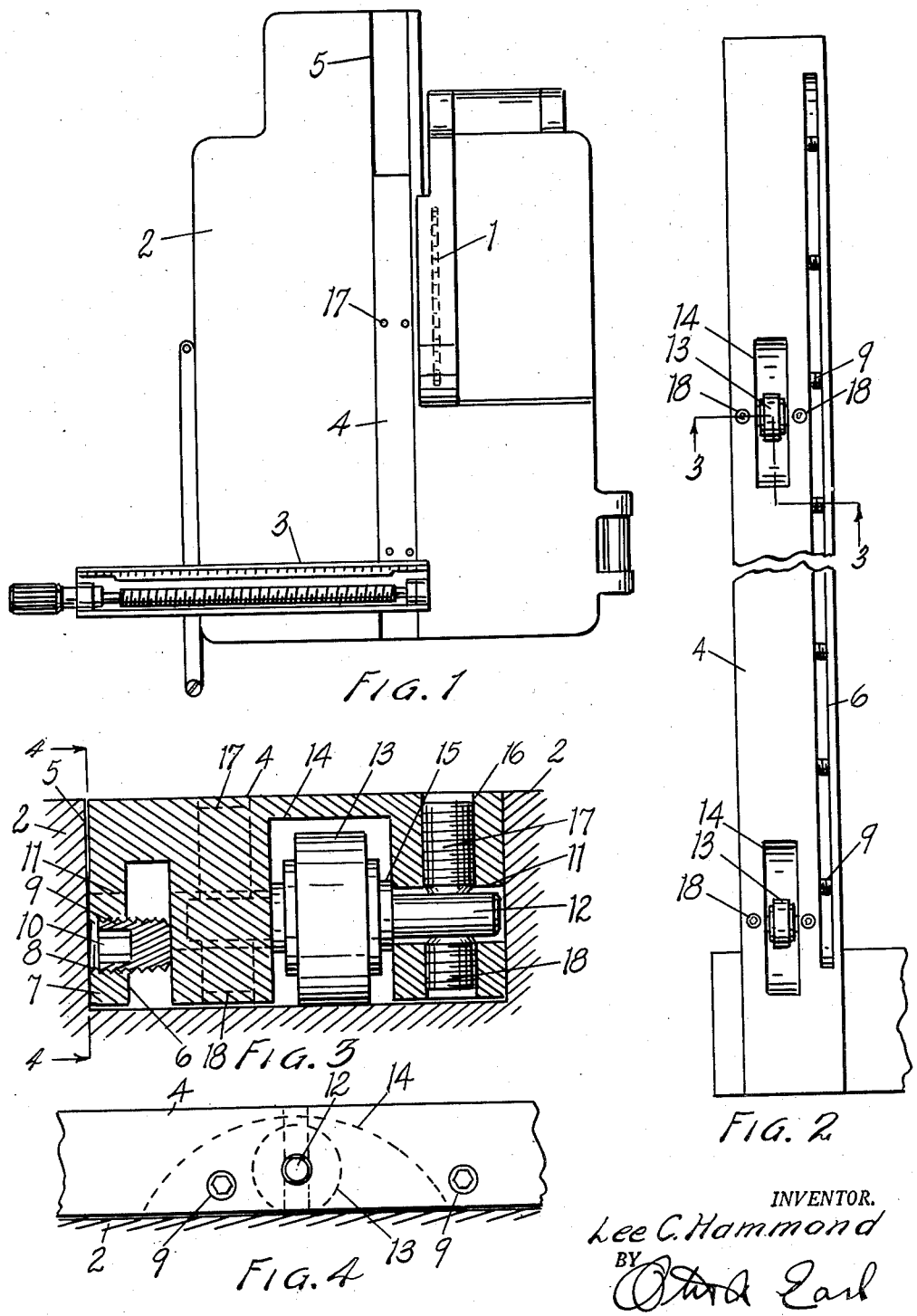
INVENTOR.
Lee C. Hammond Patented May 22, 1951

2,554,299

UNITED STATES PATENT OFFICE 2,554,299

SLOT BAR FOR SAWING MACHINES

Lee C. Hammond, Kalamazoo, Mich., assignor to Hammond Machinery Builders, Inc., Kalamazoo, Mich.

Application February 11, 1949, Serial No. 75,849

7 Claims. (Cl. 308—6)

This invention relates to improvements in slot bar for sawing machines.

The principal objects of this invention are:

First, to provide a slot bar for supporting the gauge bar on a type trimming saw table, which slot bar is easily maintained in freely slidable flush relationship with the top of the saw table.

Second, to provide a slot bar having novel means for adjusting the thickness of the bar to the size of the slot in a saw table.

Third, to provide a novel means for adjustably mounting rollers in a slot bar so that the slot bar is supported in flush relationship with the surface of a saw table and easily moved therealong on the rollers.

Fourth, to provide a slot bar for a saw table having a rolling supported engagement with the saw table along a line and an adjustable sliding engagement with the sides of the slot in the table to prevent tilting of the bar in the slot.

Fifth, to provide a slot bar which is adjustable to compensate for wear in the side of the slot in which the bar operates.

Other objects and advantages relating to details of my invention will be apparent from a consideration of the following description and claims. The drawings, of which there is one sheet, illustrate a preferred form of my slot bar.

Fig. 1 is a plan view of a saw and saw table for trimming type slugs and having my slot bar and gauge bar mounted thereon.

Fig. 2 is a fragmentary enlarged view of the underside of the slot bar.

Fig. 3 is a transverse cross sectional view through the slot bar taken on a line corresponding to the broken line 3—3 in Fig. 2 parts being shown in full lines.

Fig. 4 is a fragmentary side elevational view of the slot bar illustrating the position of the roller therein.

In making up type plates for priting it is common practice to trim slugs of type metal to the desired size for assembling into the plate. In order that the several slugs making up a plate shall join evenly in the plate it is necessary that the trimming of the slugs be extremely accurate. To this end machines are available such as the one illustrated in Fig. 1 having a saw 1 mounted on a table 2 for cutting the type slugs to proper length. The length of the slugs is controlled by placing them against a gauge bar 3 which is secured at one end to the slide bar 4. The slide bar is reciprocable in a slot 5 in the table to advance the slugs to the saw in the desired position. The length of the slugs is determined by placing one end against a gauge finger, not shown, which can be adjusted along the gauge bar to any desired position.

Since several slugs may be cut at one time it is important that the slide bar be substantially flush with the surface of the table 2 and that the slide bar and gauge bar shall move smoothly without sticking or jerking on the saw table. To this end I have provided a slide bar having a slot 6 milled in the bottom thereof and closely adjacent to one side of the bar. The slot 6 leaves a relatively thin rib 7 along one side of the slide bar and the rib is bored and tapped at spaced intervals along its length as at 8 to receive the screws 9. The screws 9 are of the headless type having sockets 10 for receiving tools to adjust the screws. By properly adjusting the screws 9 the rib 7 can be sprung sufficiently from the body of the slide bar to provide a smoothly sliding but snug fit of the slide bar in the slot 5.

In order to provide a rolling support for the slide bar in the slot, the body of the bar and the rib 7 are transversely bored as at 11 at two longitudinally spaced points along the slide bar. The bores 11 are arranged to receive axle pins 12 of substantially smaller diameter than the diameter of the bores. Journaled on the axle pins 12 are a pair of rollers 13 which are positioned in segmental recesses 14 formed in the bottom of the slide bar. Washers 15 space the sides of the rollers from the sides of the recesses.

On each side of the recesses 15 the slide bar is vertically drilled and tapped as at 16, the drills intersecting the transverse bores 11. The tapped holes 16 each receive an upper screw 17 and a lower screw 18 which project into the transverse bores 11 to supportingly engage the ends of the axle pins 12.

By properly adjusting the screws 17 and 18 the vertical position of the rollers 13 can be accurately adjusted so that the rollers project below the lower surface of the slide bar just enough to support the slide bar from the bottom of the slide with the top of the slide bar flush with the surface of the table 2. The slide bar thus has a rolling support on the saw table for easy movement and is maintained in flush relationship to the table so as not to tilt or cock the type slugs as they are supported against the gauge bar and advanced to the saw. It will be noted that the lateral adjustment of the rib 7 cooperates with the adjustable rollers in maintaining the slide bar in level position. The rollers 13 provide a line of support for the slide bar and the adjustment of the rib 7 maintains the right edge of the slide bar as viewed in Figs. 1 and 3 against the vertical edge of the slot so that the slide bar cannot tilt laterally in the slot.

Having thus described my invention, what I claim as new and desire to secure by Letters Patent is:

1. A slide bar for sawing machines comprising an elongated rectangular bar having a slot formed in the bottom thereof and adjacent to one side thereof, the rib formed by said slot being transversely bored and tapped at intervals therealong, adjusting screws threadedly engaged in the bores in said rib and bearing against the body of said bar within said slot, a pair of longitudinally spaced segmental recesses formed in the bottom of said bar, transverse holes in said bar intersecting said recesses, vertical bores in said bar intersecting said transverse holes on each side of said recesses, an axle pin positioned in each of said transverse holes, a roller journaled on each of said pins and positioned in said recesses, and upper and lower adjusting screws positioned in said vertical bores and adjustably engageable with said pins to vary the position of said rollers vertically with respect to said bar.

2. A slide bar for sawing machines comprising an elongated rectangular bar having a slot formed therein adjacent to one side thereof, the rib formed by said slot being transversely bored and tapped at intervals therealong, adjusting screws positioned in the bores in said rib and bearing against the body of said bar within said slot, a pair of longitudinally spaced segmental recesses formed in the bottom of said bar, transverse holes in said bar intersecting said recesses, vertical bores in said bar intersecting said transverse holes on each side of said recesses, an axle pin positioned in each of said transverse holes, a roller journaled on each of said pins and positioned in said recesses, and upper and lower adjusting screws positioned in said vertical bores and adjustably engageable with said pins to vary the position of said rollers vertically with respect to said bar.

3. A slide bar for sawing machines comprising an elongated rectangular bar having a slot formed therein adjacent to one side thereof, the rib formed by said slot being transversely bored and tapped at intervals therealong, adjusting screws positioned in the bores in said rib and bearing against the body of said bar within said slot, a pair of longitudinally spaced segmental recesses formed in the bottom of said bar, transverse holes in said bar intersecting said recesses, vertical bores in said bar intersecting said transverse holes on each side of said recesses, an axle pin positioned in each of said transverse holes, a roller journaled on each of said pins and positioned in said recesses, and means positioned in said vertical bores and adjustably engageable with said pins to vary the position of said rollers vertically with respect to said bar.

4. A slot bar for sawing machines comprising an elongated rectangular bar having a slot formed in the bottom thereof and adjacent to one side thereof, the rib formed by said slot being transversely bored and tapped at intervals therealong, adjusting screws positioned in the bores in said rib and bearing against the body of said bar within said slot, a pair of longitudinally spaced segmental recesses formed in the bottom of said bar, transverse holes in said bar intersecting said recesses, an axle pin positioned in each of said transverse holes and adjustable vertically of said bar, and a roller journaled on each of said pins and projecting from said recesses.

5. A slot bar for sawing machines comprising an elongated rectangular bar having a slot formed adjacent to one side thereof, the rib formed by said slot being transversely bored and tapped at intervals therealong, adjusting screws positioned in the bores in said rib and bearing against the body of said bar within said slot, a pair of longitudinally spaced segmental recesses formed in the bottom of said bar, transverse holes in said bar intersecting said recesses, an axle pin positioned in each of said transverse holes, and a roller journaled on each of said pins and projecting from said recesses.

6. A slot bar for sawing machines comprising an elongated rectangular bar having a slot formed adjacent to one side thereof, the rib formed by said slot being transversely bored at intervals therealong, adjusting screws positioned in the bores in said rib and bearing against the body of said bar within said slot, a pair of longitudinally spaced recesses formed in the bottom of said bar, transverse holes in said bar intersecting said recesses, an axle pin positioned in each of said transverse holes, and a roller journaled on each of said pins and projecting from said recesses.

7. A slide bar for sawing machines comprising an elongated rectangular bar having a longitudinal slot therein adjacent to one side thereof and terminating adjacent to but in spaced relation to the ends of the bar, providing a springable rib-like side portion for the bar, said springable side portion having transverse longitudinally spaced tapped bores therein adjacent to but spaced from the springable edge thereof, and adjusting screws positioned in said bores and bearing against the body portions of the bar at the inner side of the slot providing for springing adjustment of said rib-like side portion.

LEE C. HAMMOND.

REFERENCES CITED

The following references are of record in the file of this patent:

UNITED STATES PATENTS

| Number | Name | Date |
|---|---|---|
| 645,211 | Petsche | Mar. 13, 1900 |
| 703,749 | Stimpson | July 1, 1902 |
| 1,702,783 | Kiesling | Feb. 19, 1929 |
| 1,814,610 | Stevelman | July 14, 1931 |